United States Patent
Pan et al.

(10) Patent No.: US 12,090,612 B2
(45) Date of Patent: Sep. 17, 2024

(54) RING FOR CLASPING CYLINDRICAL OBJECT

(71) Applicant: PRIMAX ELECTRONICS LTD., Taipei (TW)

(72) Inventors: Yung-Tai Pan, Taipei (TW); Yi-Ping Hsieh, Taipei (TW); Chun-Chieh Yeh, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 352 days.

(21) Appl. No.: 17/696,228

(22) Filed: Mar. 16, 2022

(65) Prior Publication Data

US 2023/0256569 A1 Aug. 17, 2023

(30) Foreign Application Priority Data

Feb. 14, 2022 (TW) .................................. 111105326

(51) Int. Cl.
*B25B 5/00* (2006.01)
*B25B 5/04* (2006.01)
*B25B 5/14* (2006.01)
*F16M 11/04* (2006.01)

(52) U.S. Cl.
CPC .................. *B25B 5/14* (2013.01); *B25B 5/04* (2013.01); *F16M 11/041* (2013.01)

(58) Field of Classification Search
CPC .......... B25B 5/00; B25B 5/10; B29C 65/7841
See application file for complete search history.

(56) References Cited

U.S. PATENT DOCUMENTS

| | | | | |
|---|---|---|---|---|
| 4,575,061 A * | 3/1986 | Dille | ....................... | B25B 5/147 269/45 |
| 8,833,748 B2 * | 9/2014 | D'Arco | ............... | B29C 65/3468 269/143 |
| 9,151,420 B2 * | 10/2015 | McKiernan | ............. | F16L 23/10 |
| 10,422,455 B1 * | 9/2019 | Mellinger | ............... | F16L 23/06 |
| 10,738,808 B2 * | 8/2020 | Pryor | .................. | A61M 5/1415 |
| 11,167,394 B2 * | 11/2021 | Roberts | .................... | B25B 27/16 |
| 11,766,764 B1 * | 9/2023 | Henry | ....................... | B25B 5/12 269/287 |
| 2023/0256569 A1 * | 8/2023 | Pan | ...................... | F16M 11/041 269/130 |

* cited by examiner

*Primary Examiner* — Lee D Wilson
(74) *Attorney, Agent, or Firm* — WPAT, P.C (57) ABSTRACT

A ring for clasping a cylindrical object includes a first element, a second element and a switch mechanism. The second element is circumferentially butted with the first element, and one end of the first element is adjacent to one end of the second element. The end of the second element has a protrusion protruding outwardly. The switch mechanism includes an abutting member adjacent to the end of the first element and configured to be rotated to abut against or move away from the protrusion of the end of the second element. When the abutting member is rotated and abuts against the protrusion of the end of the second element, the second element is fixed; when the abutting member is rotated and moves away from the protrusion of the end of the second element, the second element is released.

17 Claims, 6 Drawing Sheets

RING FOR CLASPING CYLINDRICAL OBJECT

FIELD OF THE INVENTION

The present invention relates to a ring for clasping a cylindrical object, and more particularly, to a ring for clasping a camera lens.

BACKGROUND OF THE INVENTION

Generally, the current lens tripod ring has two components, and the two components are fixed by rotating a locking member including a screw and a spring, thereby fixing the camera lens. However, it is necessary to rotate the screw of the locking member several turns to fix or loosen the two components, which takes a lot of time, so the current lens tripod ring is inconvenient to use.

SUMMARY OF THE INVENTION

Accordingly, the present disclosure provides a ring for clasping a cylindrical object, which includes a first element, a second element and a switch mechanism. The second element is circumferentially butted with the first element, and one end of the first element is adjacent to one end of the second element, and another end of the first element is pivotally connected to another end of the second element, in which the end of the second element has a protrusion protruding outwardly. The switch mechanism is adjacent to the end of the first element and includes an abutting member adjacent to the end of the first element and configured to be rotated to abut against or move away from the protrusion of the end of the second element. When the abutting member is rotated and abuts against the protrusion of the end of the second element, the second element is fixed; when the abutting member is rotated and moves away from the protrusion of the end of the second element, the second element is released.

In some embodiments of the present invention, the abutting member is an arc-shaped abutting member, and the protrusion is a truncated circular protrusion, and an inner side of the arc-shaped abutting member is configured to abut against a circular arc side of the truncated circular protrusion.

In some embodiments of the present invention, the end of the first element has a first opening, and the abutting member is configured to be rotated within the first opening.

In some embodiments of the present invention, the abutting member is an arc-shaped abutting member, and the first opening is a truncated ring-shaped opening, and an outer ring length of the truncated ring-shaped opening is greater than an outer arc length of the arc-shaped abutting member.

In some embodiments of the present invention, the switch mechanism further includes a knob connected to the end of the first element, and the abutting member is disposed on the knob, and when the knob is rotated, the abutting member is rotated together with the knob.

In some embodiments of the present invention, the knob and the abutting member are integrally formed.

In some embodiments of the present invention, the knob has a shaft portion, and the shaft portion and the abutting member are separated from each other, and the end of the first element has a second opening, and the shaft portion is configured to be inserted into the second opening, and the shaft portion is rotated within the second opening when the knob is rotated.

In some embodiments of the present invention, the switch mechanism further includes a ring-shaped member configured to confine the shaft portion within the second opening.

In some embodiments of the present invention, the abutting member is an arc-shaped abutting member, and a distance between a first end of the arc-shaped abutting member and the shaft portion is greater than a distance between a second end of the arc-shaped abutting member and the shaft portion.

In some embodiments of the present invention, a width of the first end of the arc-shaped abutting member is smaller than a width of the second end of the arc-shaped abutting member.

In some embodiments of the present invention, the switch mechanism further includes a protruding portion disposed on the knob, and the protruding portion and the abutting member are separated from each other, and the end of the first element has a first recess facing the knob, and when the knob is rotated, the abutting member and the protruding portion are rotated together, and when the abutting member abuts against the protrusion of the end of the second element, the protruding portion enters the first recess.

In some embodiments of the present invention, the switch mechanism further includes a connecting portion, and the knob has a concave portion configured to accommodate the connecting portion and the protruding portion, and the protruding portion is adjacent to the connecting portion.

In some embodiments of the present invention, the switch mechanism further includes an elastic element in contact with the protruding portion, and the connecting portion has a recess portion configured to accommodate the protruding portion and the elastic element.

In some embodiments of the present invention, the end of the first element further has a second recess facing the knob, and the second recess and the first recess are separated from each other, and when the knob is rotated, the abutting member and the protruding portion are rotated together, and when the abutting member moves away from the protrusion of the end of the second element, the protruding portion moves away from the first recess and then enters the second recess.

In some embodiments of the present invention, the end of the first element further has a first opening and a second opening corresponding to the abutting member and a shaft portion of the knob respectively, and the first opening, the first recess and the second recess surround the second opening.

In some embodiments of the present invention, the cylindrical object is a camera lens, and the first element is a fixed portion, and the second element is an opening/closing portion, and the fixed portion is provided with a component for connecting a tripod.

DETAIL DESCRIPTION OF THE PREFERRED EMBODIMENT

The advantages and features of the present invention and the method for achieving the same will be described in more detail with reference to exemplary embodiments and the accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." The spatially relative descriptions used herein should be interpreted the same.

As mentioned in the background of the invention, the current lens tripod ring is inconvenient to use because the screw of the locking member need to be rotated several turns to fix or loosen the two components, so how to make the fixing/releasing method of the two components of the lens tripod ring more convenient has become a technical issue in the art. Accordingly, the present invention provides a ring for clasping a cylindrical object, which can solve the above-mentioned technical issue. In particular, a switch mechanism of the ring of the present invention only needs to be rotated by less than 360 degrees (e.g., less than or equal to 90 degrees, but not limited thereto) to fix two components together or release the two components, so the ring of the present invention is simple to use. Various embodiments of the ring of the present invention will be described in detail below.

Figure 1:
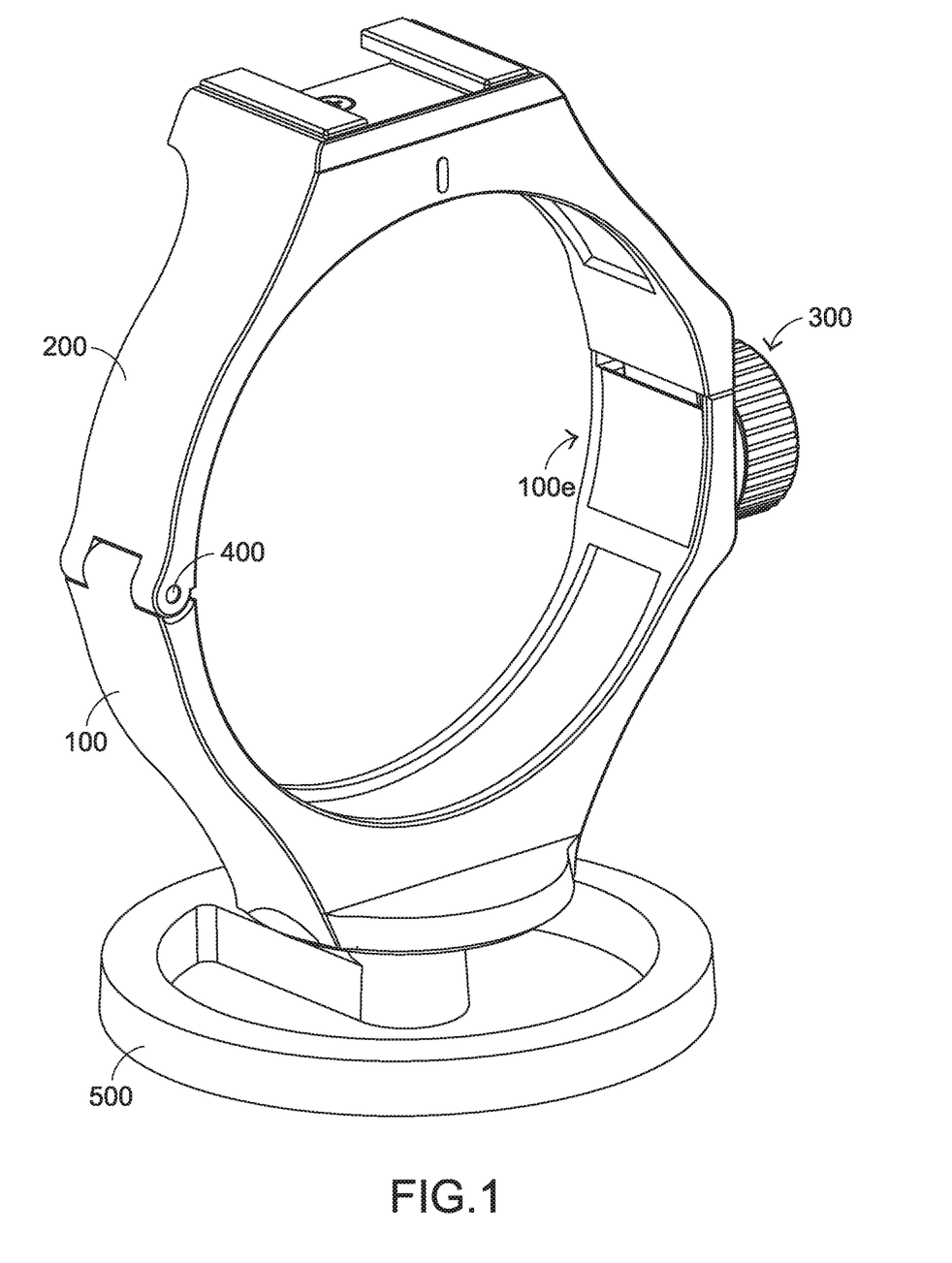
FIG. 1 is a schematic diagram of a ring according to an embodiment of the present invention.

FIG. 1 is a schematic diagram of a ring according to an embodiment of the present invention. As shown in FIG. 1, the ring for clasping a cylindrical object includes a first element 100, a second element 200 and a switch mechanism 300. The second element 200 is circumferentially butted with the first element 100. One end 100e of the first element 100 is adjacent to one end of the second element 200. Another end of the first element 100 is pivotally connected to another end of the second element 200, for example, through an opening/closing shaft 400. The switch mechanism 300 is adjacent to the end 100e of the first element 100. In some embodiments, the cylindrical object is a camera lens, and the first element 100 is a fixed portion, and the second element 200 is an opening/closing portion, and the fixed portion is provided with a component 500 for connecting a tripod, so the ring of the present invention is also called as a lens tripod ring or a tripod mount ring.

Figure 2:
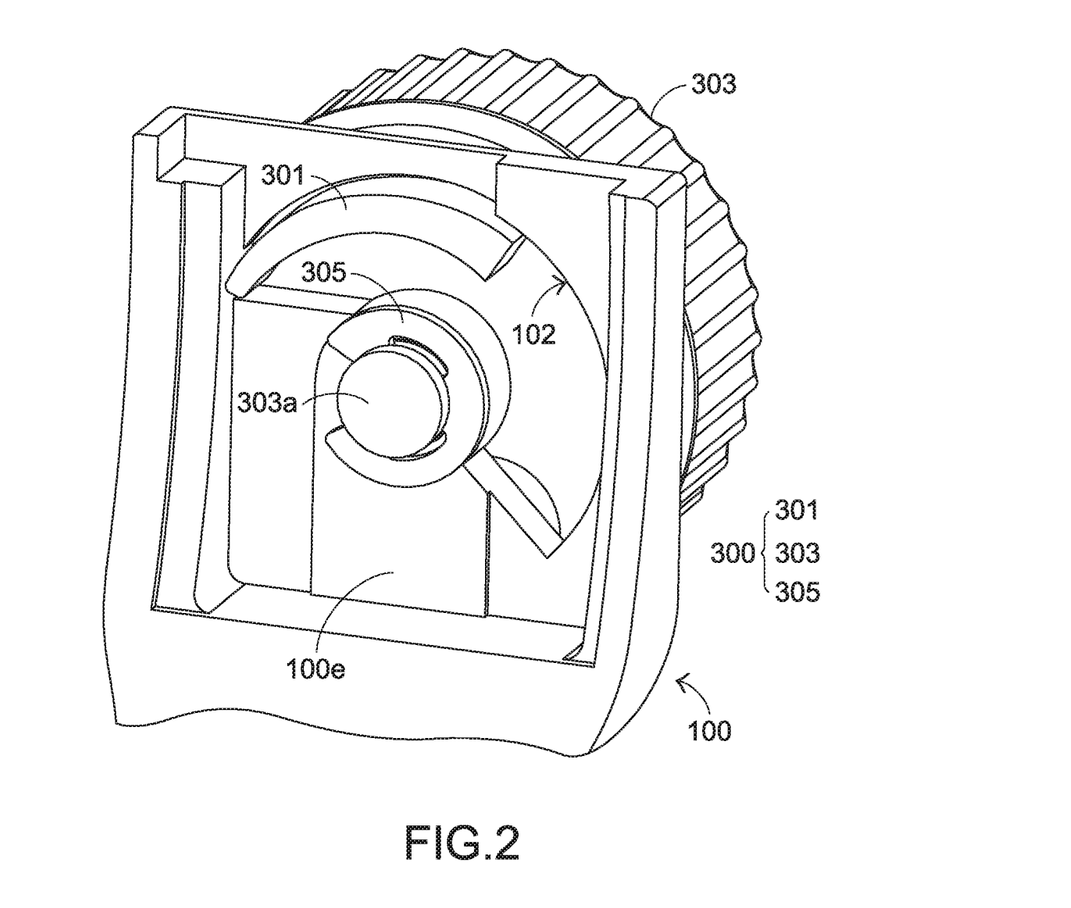
FIG. 2 is a schematic diagram of an end of a first element and a switch mechanism according to an embodiment of the present invention.

FIG. 2 is a schematic diagram of an end 100e of a first element 100 and a switch mechanism 300 according to an embodiment of the present invention. As shown in FIG. 2, the switch mechanism 300 includes an abutting member 301 adjacent to the end 100e of the first element 100. In some embodiments, the end 100e of the first element 100 has a first opening 102, and the abutting member 301 is configured to be rotated within the first opening 102. In some embodiments, the abutting member 301 is an arc-shaped abutting member, and the first opening 102 is a truncated ring-shaped opening, and the abutting member 301 is rotated close to an outer ring edge of the first opening 102. A size of the first opening 102 is larger than that of the abutting member 301. An area of the first opening 102 is larger than an area of an upper surface of the abutting member 301. An outer ring length of the truncated ring-shaped opening 102 is greater than an outer arc length of the arc-shaped abutting member 301. In some embodiments, a ratio of the outer ring length of the truncated ring-shaped opening 102 to the outer arc length of the arc-shaped abutting member 301 is in a range of from 1.8 to 2.2:1, but the present invention is not limited thereto. In some embodiments, the first opening 102 is a through hole, but not limited thereto. In other embodiments, the first opening 102 can be a blind hole.

In some embodiments, as shown in FIG. 2, the switch mechanism 300 further includes a knob 303 connected to the end 100e of the first element 100, and the abutting member 301 is disposed on the knob 303, and when the knob 303 is rotated, the abutting member 301 is rotated together with the knob 303. In some embodiments, the knob 303 and the abutting member 301 are integrally formed.

In some embodiments, as shown in FIG. 2, the knob 303 has a shaft portion 303a, and the shaft portion 303a and the abutting member 301 are separated from each other, and the end 100e of the first element 100 has a second opening (not shown in FIG. 2, please refer to a second opening 104 in FIG. 8), the shaft portion 303a is configured to be inserted into the second opening, and the shaft portion 303a is rotated within the second opening when the knob 303 is rotated.

In some embodiments, as shown in FIG. 2, the switch mechanism 300 further includes a ring-shaped member 305 configured to confine the shaft portion 303a within the second opening. As such, the knob 303 cannot leave the end 100e of the first element 100. In some embodiments, the ring-shaped member 305 is E-shaped or has another suitable shape.

Figure 3:
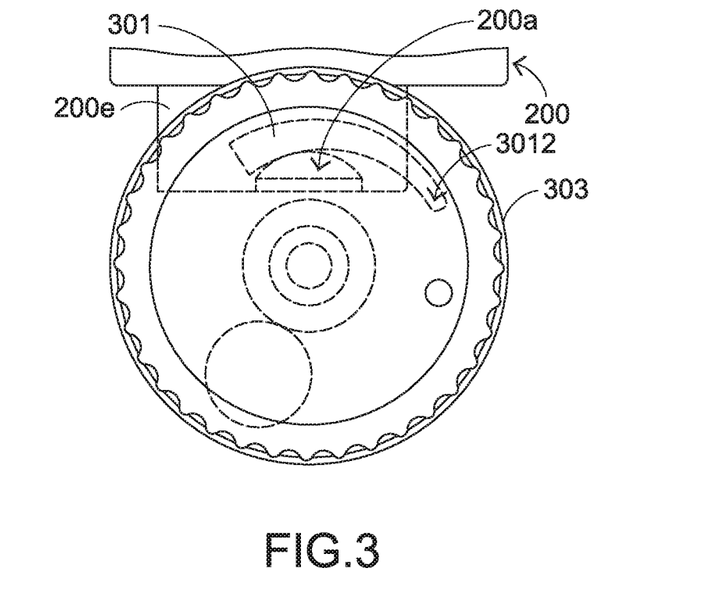
FIG. 3 is a schematic diagram of an end of a second element and a switch mechanism according to an embodiment of the present invention.

FIG. 3 is a schematic diagram of an end 200e of a second element 200 and a switch mechanism according to an embodiment of the present invention, in which an abutting member 301 of the switch mechanism and a portion of the end 200e of the second element 200 are shown in a perspective manner. As shown in FIG. 3, the end 200e of the second member 200 has a protrusion 200a protruding outwardly. The abutting member 301 is configured to be rotated to abut against or move away from the protrusion 200a of the end 200e of the second element 200. It is worth noting that, as shown in FIG. 3, when the abutting member 301 is rotated (e.g., rotated clockwise) and abuts against the protrusion 200a of the end 200e of the second element 200, the protrusion 200a fails to disengage from the abutting member 301, so that the second element 200 is fixed.

Figure 4:
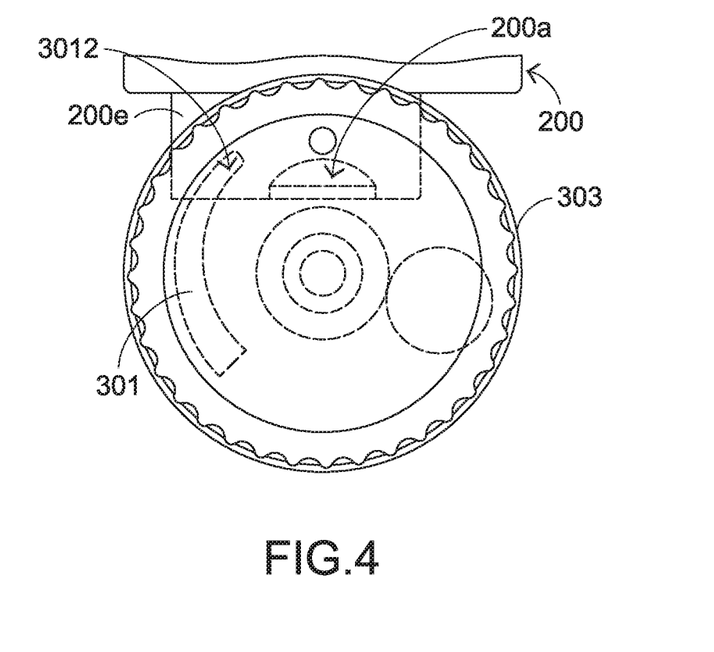
FIG. 4 is a schematic diagram of an end of a second element and a switch mechanism according to an embodiment of the present invention.

FIG. 4 is a schematic diagram of an end 200e of a second element 200 and a switch mechanism according to an embodiment of the present invention, in which an abutting member 301 of the switch mechanism and a portion of the end 200e of the second element 200 are shown in a perspective manner. As shown in FIG. 4, when the abutting member 301 is rotated (e.g., rotated counterclockwise) and moves away from the protrusion 200a of the end 200e of the second member 200, the protrusion 200a is in a free state, so that the second member 200 can be released.

As shown in the embodiments of FIG. 3 and FIG. 4, the second element 200 can be fixed on the first element 100 when the abutting member 301 is rotated by 90 degrees clockwise, and the second element 200 can be released from the first element 100 when the abutting member 301 is rotated by 90 degrees counterclockwise. It can be seen that the rotation of the abutting member of the present invention less than 360 degrees (e.g., less than or equal to 90 degrees, but not limited thereto. The angle may be less than or equal to 270 degrees, or less than or equal to 180 degrees) is able to fix the first element and the second element together or to release the first element and the second element relatively, so the ring of the present invention is convenient to use.

In some embodiments, as shown in FIG. 3 and FIG. 4, the abutting member 301 is an arc-shaped abutting member, and the protrusion 200a is a truncated circular protrusion, and an inner side of the arc-shaped abutting member 301 is configured to interfere with and then press against a circular arc side of the truncated circular protrusion 200a, but the present invention is not limited thereto. Shapes and setting positions of the abutting member and the protrusion can be adjusted or changed appropriately, so that those are able to interfere with each other and then press against each other.

Figure 5:
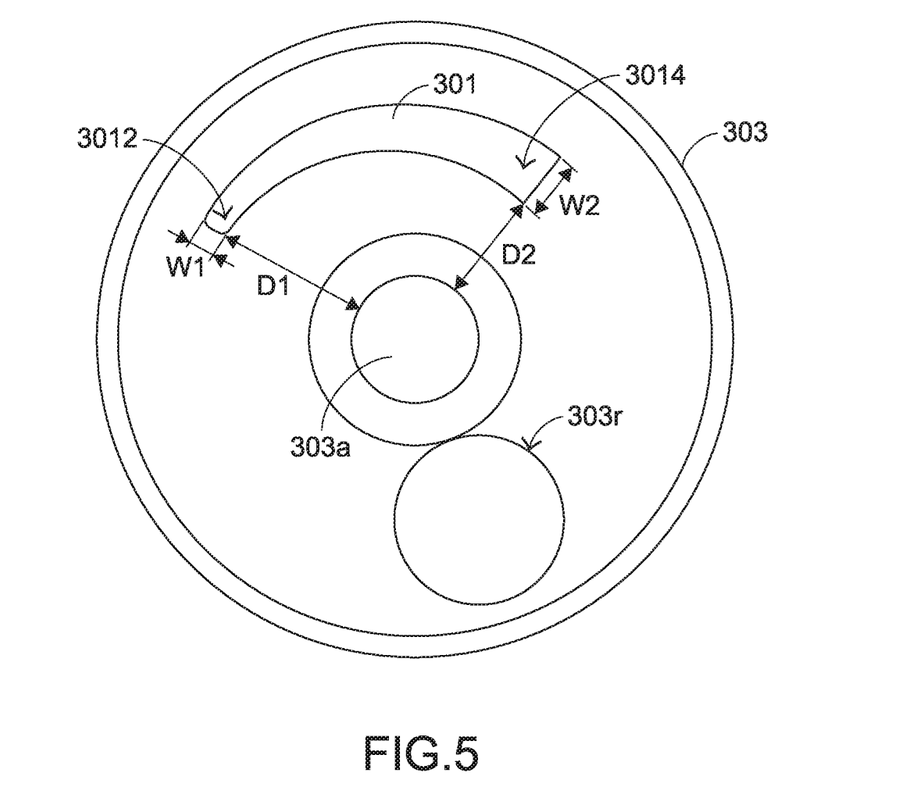
FIG. 5 is a schematic diagram of a switch mechanism according to an embodiment of the present invention.

FIG. 5 is a schematic diagram of a switch mechanism according to an embodiment of the present invention. In some embodiments, as shown in FIG. 5, an abutting member 301 is an arc-shaped abutting member, and a distance D1 between a first end 3012 of the arc-shaped abutting member 301 and a shaft portion 303a is greater than a distance D2 between a second end 3014 of the arc-shaped abutting member 301 and the shaft portion 303a. The distance between the arc-shaped abutting member 301 and the shaft portion 303a gradually decreases from the first end 3012 to the second end 3014. In some embodiments, a width W1 of the first end 3012 of the arc-shaped abutting member 301 is smaller than a width W2 of the second end 3014 of the arc-shaped abutting member 301. The width of the arc-shaped abutting member 301 gradually increases from the first end 3012 to the second end 3014.

Please refer to FIG. 4 and FIG. 3, through the shape design of the arc-shaped abutting member 301 in FIG. 5, when the abutting member 301 is rotated clockwise, the first end 3012 of the abutting member 301 gradually approaches the protrusion 200a, and a middle portion of the abutting member 301 begins to interfere with and then gradually abuts and presses against the protrusion 200a, so that the protrusion 200a fails to disengage from the abutting member 301, and the second element 200 is fixed.

Figure 6:
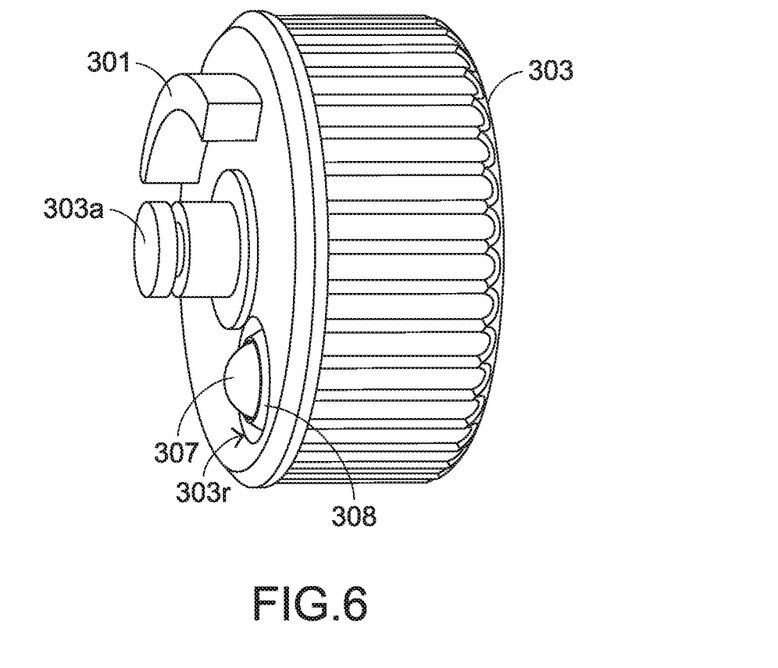
FIG. 6 is a schematic diagram of a switch mechanism according to an embodiment of the present invention.

FIG. 6 is a schematic diagram of a switch mechanism according to an embodiment of the present invention. In some embodiments, as shown in FIG. 6, the switch mechanism further includes a protruding portion 307 disposed on the knob 303, and the protruding portion 307 and the abutting member 301 are separated from each other. In some embodiments, the protruding portion 307 and the abutting member 301 are disposed on opposite sides of the knob 303, but the present invention is not limited thereto. Positions of the protruding portion 307 and the abutting member 301 can be appropriately adjusted according to actual needs. In some embodiments, a height of the abutting member 301 is greater than a height of the protruding portion 307 protruding from a surface of the knob 303, but the present invention is not limited thereto.

In some embodiments, as shown in FIG. 6, the switch mechanism further includes a connecting portion 308, and the knob 303 has a concave portion 303r, which is configured to accommodate the connecting portion 308 and the protruding portion 307, and the protruding portion 307 is adjacent to the connecting portion 308. When the knob 303 is rotated, the protruding portion 307 is rotated together with the knob 303.

Figure 7:
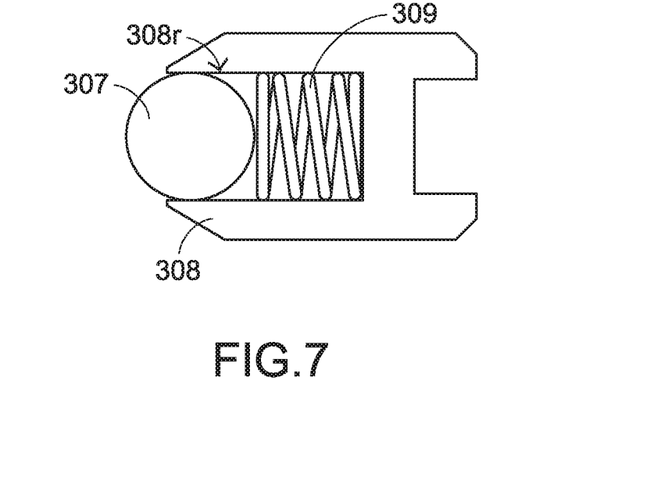
FIG. 7 is a schematic cross-sectional view of a protruding portion and a connecting portion according to an embodiment of the present invention.

FIG. 7 is a schematic cross-sectional view of a protruding portion 307 and a connecting portion 308 according to an embodiment of the present invention. In some embodiments, as shown in FIG. 7, the connecting portion 308 has a recess portion 308r configured to accommodate the protruding portion 307. In some embodiments, a shape of the protruding portion 307 cooperates with a shape of the recess portion 308r. For example, the protruding portion 307 is a spherical body (e.g., a ball), and the recess portion 308r is hollow cylindrical shaped, but the present invention is not limited thereto.

In some embodiments, as shown in FIG. 7, the switch mechanism further includes an elastic element 309, and the recess portion 308r of the connecting portion 308 is further configured to accommodate the elastic element 309, and the protruding portion 307 is in contact with (or connected to) the elastic element 309. As shown in FIGS. 6 and 7, when the protruding portion 307 is not pressed, a portion of the protruding portion 307 protrudes from the surface of the knob 303. When the protruding portion 309 is pressed, the elastic element 309 is compressed, and the protruding portion 307 moves to inside of the recess portion 308r.

Figure 8:
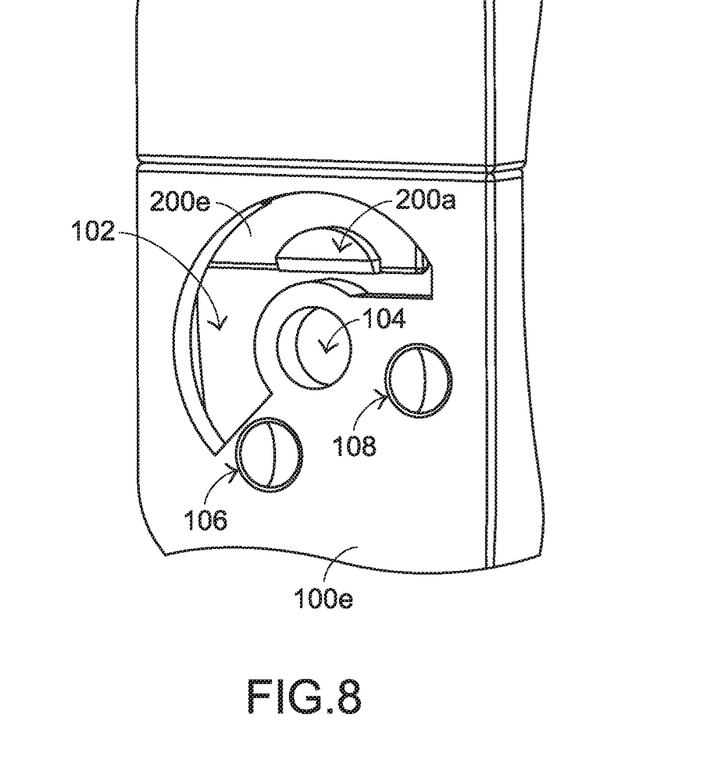
FIG. 8 is a schematic diagram of an end of a first element and an end of a second element according to an embodiment of the present invention.

FIG. 8 is a schematic diagram of an end 100e of a first element and an end 200e of a second element according to an embodiment of the present invention. In some embodiments, as shown in FIG. 8, the end 100e of the first element has a first recess 106, which faces the knob 303 shown in FIG. 6. When the knob 303 of FIG. 6 is rotated, the abutting member 301 and the protruding portion 307 are rotated together. Referring to FIGS. 3, 6 and 8, when the abutting member 301 abuts against the protrusion 200a of the end 200e of the second element 200, the protruding portion 307 enters the first recess 106, which produces a sense of switching (e.g., the sound and/or the hand feeling produced by the protruding portion 307 entering the first recess 106 due to the release of the elastic element 309). That is, when the second element 200 is fixed, the sense of switching appears at the same time, which can remind the user that the ring of the present invention has been converted to the fixed state.

In some embodiments, as shown in FIG. 8, the end 100e of the first element further has a second recess 108, which faces the knob 303 and is separated from the first recess 106. When the knob 303 is rotated, the abutting member 301 and the protruding portion 307 are rotated together. Referring to FIGS. 4, 6 and 8, when the abutting member 301 moves away from the protrusion 200a of the end 200e of the second element 200, the protruding portion 307 moves away from the first recess 106 and then enters the second recess 108, which produces a sense of switching (e.g., the sound and/or the hand feeling produced by the protruding portion 307 entering the second recess 108 due to the release of the elastic element 309). That is, when the second element 200 is completely released, the sense of switching appears at the same time, which can remind the user that the ring of the present invention has been converted to the released state.

In some embodiments, as shown in FIG. 8, in addition to the first recess 106 and the second recess 108, the end 100e of the first element further has a first opening 102 and a second opening 104 respectively corresponding to the abutting member 301 and the shaft portion 303a of the knob 303 shown in FIG. 6. The first opening 102, the first recess 106 and the second recess 108 surround the second opening 104. In some embodiments, the first recess 106 and the second recess 108 are blind holes, but the present invention is not limited thereto. In other embodiments, the first recess and the second recess can be through holes.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not used to limit the scope of claims of the present invention.

What is claimed is:

1. A ring for clasping a cylindrical object, the ring comprising:
    a first element;
    a second element, circumferentially butted with the first element, and one end of the first element being adjacent to one end of the second element, and another end of the first element being pivotally connected to another end of the second element, wherein the end of the second element has a protrusion protruding outwardly; and
    a switch mechanism, adjacent to the end of the first element, the switch mechanism comprising:
        an abutting member, adjacent to the end of the first element and configured to be rotated to abut against or move away from the protrusion of the end of the second element, wherein when the abutting member is rotated and abuts against the protrusion of the end of the second element, the second element is fixed; when the abutting member is rotated and moves away from the protrusion of the end of the second element, the second element is released, wherein the cylindrical object is a camera lens, and the first element is a fixed portion, and the second element is an opening/closing portion, and the fixed portion is provided with a component for connecting a tripod.

2. The ring of claim 1, wherein the abutting member is an arc-shaped abutting member, and the protrusion is a truncated circular protrusion, and an inner side of the arc-shaped abutting member is configured to abut against a circular arc side of the truncated circular protrusion.

3. The ring of claim 1, wherein the end of the first element has a first opening, and the abutting member is configured to be rotated within the first opening.

4. The ring of claim 3, wherein the abutting member is an arc-shaped abutting member, the first opening is a truncated ring-shaped opening, and an outer ring length of the truncated ring-shaped opening is greater than an outer arc length of the arc-shaped abutting member.

5. The ring of claim 1, wherein the switch mechanism further comprises a knob connected to the end of the first element, and the abutting member is disposed on the knob, and when the knob is rotated, the abutting member is rotated together with the knob.

6. The ring of claim 5, wherein the knob and the abutting member are integrally formed.

7. The ring of claim 5, wherein the knob has a shaft portion, and the shaft portion and the abutting member are separated from each other, and the end of the first element has a second opening, and the shaft portion is configured to be inserted into the second opening, and the shaft portion is rotated within the second opening when the knob is rotated.

8. The ring of claim 7, wherein the switch mechanism further comprises a ring-shaped member configured to confine the shaft portion within the second opening.

9. The ring of claim 7, wherein the abutting member is an arc-shaped abutting member, and a distance between a first end of the arc-shaped abutting member and the shaft portion is greater than a distance between a second end of the arc-shaped abutting member and the shaft portion.

10. The ring of claim 9, wherein a width of the first end of the arc-shaped abutting member is smaller than a width of the second end of the arc-shaped abutting member.

11. The ring of claim 5, wherein the switch mechanism further comprises a protruding portion disposed on the knob, and the protruding portion and the abutting member are separated from each other, and the end of the first element has a first recess facing the knob, and when the knob is rotated, the abutting member and the protruding portion are rotated together, and when the abutting member abuts against the protrusion of the end of the second element, the protruding portion enters the first recess.

12. The ring of claim 11, wherein the switch mechanism further comprises a connecting portion, and the knob has a concave portion configured to accommodate the connecting portion and the protruding portion, and the protruding portion is adjacent to the connecting portion.

13. The ring of claim 12, wherein the switch mechanism further comprises an elastic element in contact with the protruding portion, and the connecting portion has a recess portion configured to accommodate the protruding portion and the elastic element.

14. The ring of claim 11, wherein the end of the first element further has a second recess facing the knob, and the second recess and the first recess are separated from each other, and when the knob is rotated, the abutting member and the protruding portion are rotated together, and when the abutting member moves away from the protrusion of the end of the second element, the protruding portion moves away from the first recess and then enters the second recess.

15. The ring of claim 14, wherein the end of the first element further has a first opening and a second opening corresponding to the abutting member and a shaft portion of the knob respectively, and the first opening, the first recess and the second recess surround the second opening.

16. A ring for clasping a cylindrical object, the ring comprising:
    a first element;
    a second element, circumferentially butted with the first element, and one end of the first element being adjacent to one end of the second element, and another end of the first element being pivotally connected to another end of the second element, wherein the end of the second element has a protrusion protruding outwardly; and
    a switch mechanism, adjacent to the end of the first element, the switch mechanism comprising:
        an abutting member, adjacent to the end of the first element and configured to be rotated to abut against or move away from the protrusion of the end of the second element, wherein when the abutting member is rotated and abuts against the protrusion of the end of the second element, the second element is fixed; when the abutting member is rotated and moves away from the protrusion of the end of the second element, the second element is released, wherein the abutting member is an arc-shaped abutting member, and the protrusion is a truncated circular protrusion, and an inner side of the arc-shaped abutting member is configured to abut against a circular arc side of the truncated circular protrusion.

17. A ring for clasping a cylindrical object, the ring comprising:
a first element;
a second element, circumferentially butted with the first element, and one end of the first element being adjacent to one end of the second element, and another end of the first element being pivotally connected to another end of the second element, wherein the end of the second element has a protrusion protruding outwardly; and
a switch mechanism, adjacent to the end of the first element, the switch mechanism comprising:
an abutting member, adjacent to the end of the first element and configured to be rotated to abut against or move away from the protrusion of the end of the second element, wherein when the abutting member is rotated and abuts against the protrusion of the end of the second element, the second element is fixed; when the abutting member is rotated and moves away from the protrusion of the end of the second element, the second element is released, wherein the end of the first element has a first opening, the abutting member is configured to be rotated within the first opening, the abutting member is an arc-shaped abutting member, the first opening is a truncated ring-shaped opening, and an outer ring length of the truncated ring-shaped opening is greater than an outer arc length of the arc-shaped abutting member.

\* \* \* \* \*